United States Patent
Zimmerman et al.

(10) Patent No.: US 11,762,422 B1
(45) Date of Patent: Sep. 19, 2023

(54) ELECTRONIC DEVICES WITH DROP PROTECTION

(71) Applicant: Apple Inc., Cupertino, CA (US)

(72) Inventors: Aidan N. Zimmerman, Sunnyvale, CA (US); Evan D. Christensen, Campbell, CA (US); Ivan S. Maric, San Francisco, CA (US); Jason C. Sauers, Sunnyvale, CA (US); John S. Camp, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/322,591

(22) Filed: May 17, 2021

Related U.S. Application Data

(60) Provisional application No. 63/048,605, filed on Jul. 6, 2020.

(51) Int. Cl.
*G06F 1/16* (2006.01)

(52) U.S. Cl.
CPC ............ *G06F 1/163* (2013.01); *G06F 1/1656* (2013.01)

(58) Field of Classification Search
CPC .... G06F 1/1626; G06F 1/1613; G06F 1/1637; G06F 1/163; G06F 3/0202; H04R 1/1008; G02B 27/0176; G02B 7/02; G02B 25/001; G02B 7/12; G02C 5/02; G02C 9/00
See application file for complete search history.

(56) References Cited

U.S. PATENT DOCUMENTS

| | | | |
|---|---|---|---|
| 7,697,281 B2 | 4/2010 | Dabov et al. | |
| 8,391,010 B2 | 5/2013 | Rothkopf et al. | |
| 8,629,815 B2 | 1/2014 | Brin et al. | |
| 9,025,252 B2 | 5/2015 | Lewis et al. | |
| 9,075,249 B2 | 7/2015 | Heinrich et al. | |
| 9,470,906 B2 | 10/2016 | Kaji et al. | |
| 9,939,850 B2 | 4/2018 | Hoellwarth et al. | |
| 2013/0250503 A1 | 9/2013 | Olsson et al. | |
| 2015/0138645 A1* | 5/2015 | Yoo .................... | G02B 27/0101 359/630 |
| 2015/0235426 A1* | 8/2015 | Lyons .................... | A63F 13/26 345/8 |
| 2016/0011424 A1* | 1/2016 | Thurber ............. | G02B 27/0176 345/8 |
| 2016/0203642 A1* | 7/2016 | Thomas ................ | G06T 19/006 345/8 |

(Continued)

*Primary Examiner* — Rockshana D Chowdhury
(74) *Attorney, Agent, or Firm* — TREYZ LAW GROUP, P.C.; G. Victor Treyz; David K. Cole

(57) ABSTRACT

An electronic device may have a housing that separates an exterior region from an interior region. The housing may have a front layer on a front face of the housing and a rear layer on an opposing rear face of the housing. Sidewall structures may extend between the front and rear layers. The housing may form a head-mounted housing that is configured to be worn on a user's head. An internal frame may be mounted in the interior region. The internal frame may have a nose bridge structure that is coupled to the housing with a coupling member such as a coupling member formed from an elastomeric vibration damping material. Other portions of the frame such elongated laterally extending support members may not contact any portion of the housing and may therefore be isolated from the housing during drop events.

20 Claims, 8 Drawing Sheets

(56) References Cited

U.S. PATENT DOCUMENTS

| | | | |
|---|---|---|---|
| 2016/0255748 A1* | 9/2016 | Kim | G02B 27/017 |
| | | | 361/695 |
| 2016/0357250 A1* | 12/2016 | Kim | G02B 27/017 |
| 2017/0011706 A1* | 1/2017 | Namkung | G06F 1/163 |
| 2017/0090514 A1* | 3/2017 | Byun | G02B 27/0176 |
| 2017/0102549 A1* | 4/2017 | Lee | G02B 27/0179 |
| 2017/0192499 A1* | 7/2017 | Trail | G06F 1/163 |
| 2017/0214905 A1 | 7/2017 | Wu | |
| 2017/0296121 A1 | 10/2017 | Dar et al. | |

* cited by examiner

ELECTRONIC DEVICES WITH DROP PROTECTION

This application claims the benefit of provisional patent application No. 63/048,605, filed Jul. 6, 2020, which is hereby incorporated by reference herein in its entirety.

FIELD

This relates generally to electronic devices, and, more particularly, to head-mounted electronic devices.

BACKGROUND

Electronic devices may contain components mounted in a housing. Head-mounted devices have structures that allow these devices to be worn on the heads of users.

SUMMARY

An electronic device such as a head-mounted device may have a housing that separates an exterior region from an interior region. The housing may have a front layer on a front face of the housing and a rear layer on an opposing rear face of the housing. Sidewall structures may extend between the front and rear layers so that the housing encloses the interior region.

An internal frame may be mounted in the interior region. The internal frame may be used to support optical modules, forward-facing cameras, and/or other optical components in alignment with one another.

The internal frame may have a nose bridge structure that is coupled to a central portion of the housing with a coupling member such as a coupling member formed from a vibration damping material. The internal frame may have elongated laterally extending support members. For example, the internal frame may have one or more laterally extending guide rods that are coupled to opposing left and right sides of the nose bridge structure. The guide rods may receive respective left and right optical modules for sliding movement to accommodate different user interpupillary distances.

The frame may be configured so that the guide rods do not contact the housing. This helps isolate the internal frame from the housing during drop events. As a result, even during a drop event that plastically deforms the housing, the internal frame may not plastically deform and may maintain optical components such as the optical modules and cameras in alignment with each other. Isolation between the housing and the internal frame may also help ensure that the frame is not subjected to bending stress or other stresses applied to the housing. In this way, the internal frame may be prevented from elastically deforming, which could potentially misalign the optical modules and other optical components in alignment with each other during normal use (e.g., when the head-mounted device is being worn by the user). With sufficient isolation, the internal frame may be prevented from elastically deforming and causing component misalignment, even in situations in which the housing is deformed.

If desired, hard stop structures may be formed in the housing to prevent over-travel of the guide rods during a drop event and thereby help prevent plastic deformation of the internal frame.

DETAILED DESCRIPTION

An electronic device may have input-output devices for gathering input and providing output. These devices may include optical components such as cameras, displays, and lenses.

In electronic devices such as head-mounted devices, optical component alignment can be adversely affected if the device is subjected to excessive stress. To help prevent optical component misalignment due to drop events or other events that may impart stress on electronic devices, electronic devices may be provided with an internal frame to which optical components are mounted. The internal frame may be surrounded by an external housing that is coupled to the internal frame with an elastic coupling member or other structures that can help isolate the internal frame and its components from excessive stress.

Figure 1:
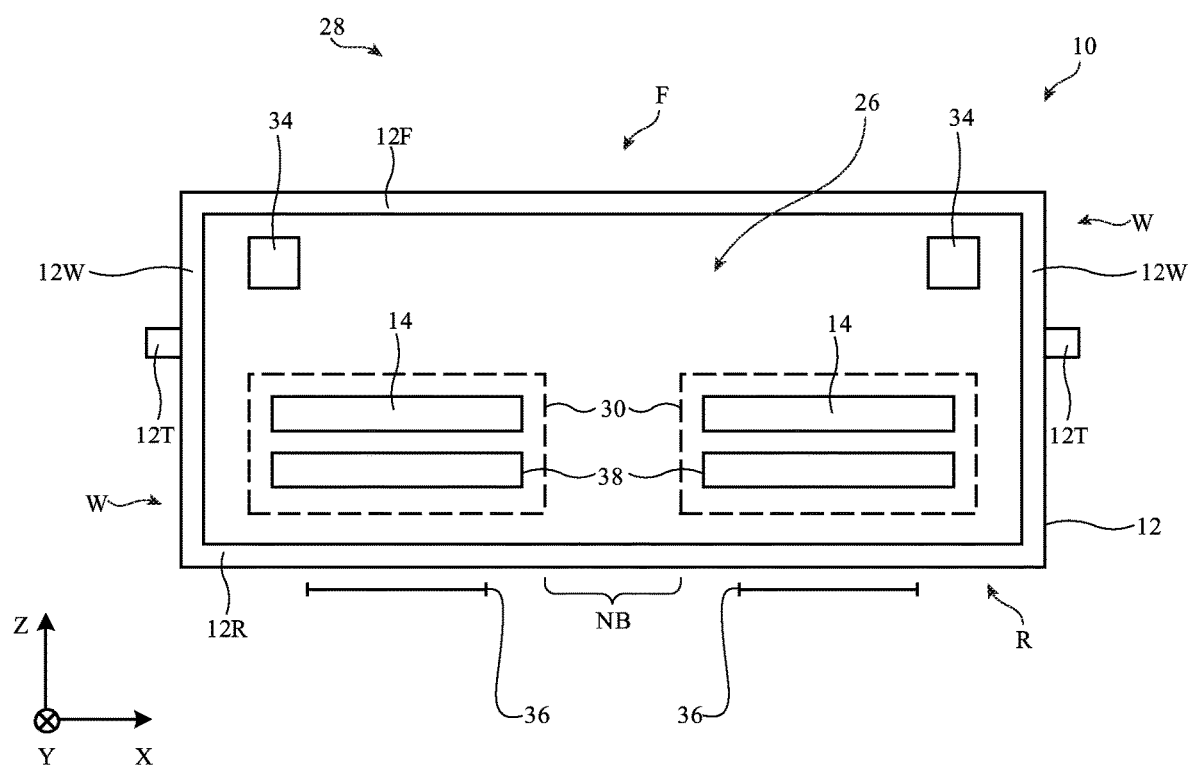
FIG. 1 is a top view of an illustrative electronic device in accordance with an embodiment.

A top view of an illustrative electronic device is shown in FIG. 1. Electronic device 10 of FIG. 1 may be a head-mounted device or other suitable device. As shown in FIG. 1, device 10 may have a housing such as housing 12. Housing 12, which may sometimes be referred to as a housing wall, external housing, housing structures, enclosure, or case, may be formed from materials such as polymer, glass, metal, crystalline materials such as sapphire, ceramic, fabric, foam, wood, other materials, and/or combinations of these materials.

Device 10 may have any suitable shape. Housing 12 may, for example, be configured to form a head-mounted housing in the shape of a pair of goggles (e.g., goggles having optional head straps such as straps 12T, a nose bridge portion in nose bridge region NB that is configured to fit over a user's nose and help support housing 12 on the user's nose, etc.) and/or other head-mounted structures. Housing 12 may separate interior region 26 from exterior region 28. Housing 12 may include portions such as front portion (front wall) 12F on front face F of device 10, rear portion (rear wall) 12R on opposing rear face R of device 10, and sidewall portions such as sidewall portions 12W that extend between front portion 12F and rear portion 12R, so that housing 12 encloses interior region 26.

Electrical and optical components may be mounted within housing 12 (e.g., in interior region 26). As an example, housing 12 may have optical components in interior region 26 such as front-facing cameras 34 (e.g., cameras that face in the +Z direction of FIG. 1 to capture images to the front of device 10), displays 14, and lenses 38.

Cameras 34 may be visible light cameras and/or may be sensitive at infrared wavelengths. There may be multiple cameras 34 in device 10. In the example of FIG. 1, device 10 includes a pair of cameras 34 on opposing left and right sides of device 10. During operation, cameras 34 may capture images of the real world (e.g., so that these images may be merged with computer-generated information on displays 14).

Figure 2:
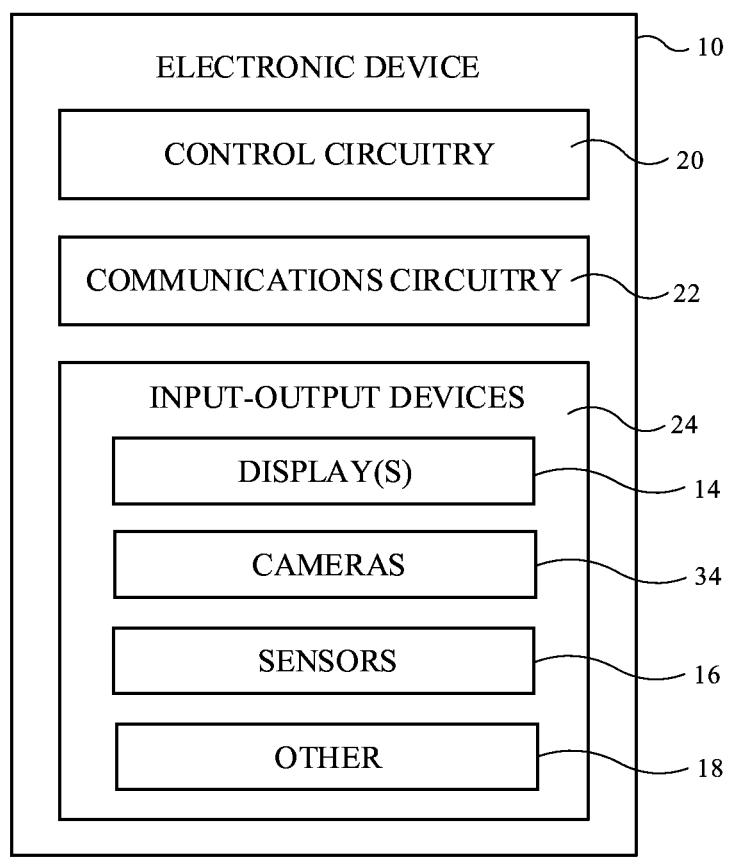
FIG. 2 is a schematic diagram of an illustrative electronic device in accordance with an embodiment.

A schematic diagram of an illustrative electronic device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections) and/or may be used to receive such information from external electronic devices. Each of these external devices may include components of the type shown by device 10 of FIG. 2.

As shown in FIG. 2, electronic device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors (e.g., cameras) and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link.

Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Electronic components such as input-output devices 24 may be used in gathering user input, in gathering information on the environment surrounding the user, and/or in providing a user with output.

Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Devices 24 may also include cameras 34. Cameras 34 may include visible light cameras, infrared cameras, and/or cameras that are sensitive at multiple wavelengths, may include three-dimensional camera systems such as depth sensors (e.g., structured light sensors and/or depth sensors based on stereo imaging devices that capture three-dimensional images), may include time-of-flight cameras, and/or may include other cameras. Cameras 34 may face toward the user of device 10 and/or away from the user of device 10.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, optical sensors such as self-mixing sensors and light detection and ranging (lidar) sensors, humidity sensors, moisture sensors, gaze tracking sensors, electromyography sensors to sense muscle activation, facial sensors, interferometric sensors, time-of-flight sensors, magnetic sensors, resistive sensors, distance sensors, angle sensors, and/or other sensors. In some arrangements, device 10 may use sensors 16 and/or other input-output devices 24 to gather user input. For example, input-output devices 24 such as buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

Input-output devices 24 may include optical components such as depth sensors (e.g., structured light sensors or other sensors that gather three-dimensional image data), optical proximity sensors, ambient light sensors (e.g., color ambient light sensors), optical time-of-flight sensors and other sensors 16 that are sensitive to visible and/or infrared light and that may emit visible and/or infrared light (e.g., devices 24 may contain optical sensors that emit and/or detect light). For example, a visible-light image sensor in a camera may have a visible light flash or an associated infrared flood illuminator to provide illumination while the image sensor captures a two-dimensional and/or three-dimensional image. An infrared camera such as an infrared structured light camera that captures three-dimensional infrared images may have an infrared flood illuminator that emits infrared flood illumination and/or may have a dot projector the emits an array of infrared light beams. Infrared proximity sensors may emit infrared light and detect the infrared light after the infrared light has reflected from a target object.

If desired, electronic device 10 may include additional components (see, e.g., other devices 18 in input-output devices 24). The additional components may include haptic output devices, actuators for moving movable structures in device 10, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Satisfactory operation of device 10 may benefit from proper alignment of the optical components within device 10. For example, it may be desirable to align left and right cameras (e.g., cameras 34 of FIG. 1) with respect to each other so that satisfactory stereo images can be captured. It may also be desirable to align cameras 34 with respect to the displays of device 10 (e.g., to ensure that captured real-world images are oriented properly when presented to the user). Satisfactory alignment between the left and right optical modules of device 10 (e.g., alignment of the left and right displays and associated lenses with respect to each other and with respect to eye boxes 36) may help reduce viewer discomfort and ensure that visual content is displayed without distortion.

To help ensure that optical components in device 10 do not become misaligned with respect to each other and/or with respect to locations such as eye boxes 36, optical components (cameras, displays, lenses, etc.) can be mounted on a rigid support structure such as a rigid frame within the interior of device 10.

Figure 3:
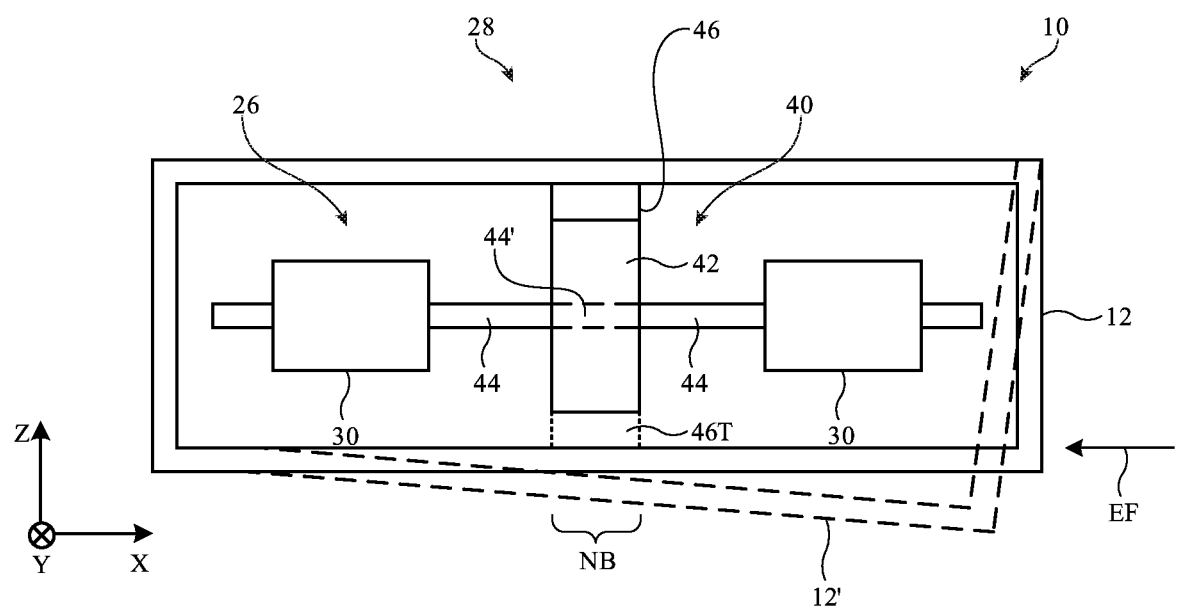
FIG. 3 is top view of an illustrative electronic device showing how an outer housing structure may deform under impact during a drop event in accordance with an embodiment.

FIG. 3 is a top view of an illustrative head-mounted device with a rigid internal frame structure. As shown in FIG. 3, housing 12 of device 10 may surround and enclose interior region 26 while separating exterior region 28 from interior region 26. Internal frame 40 may be mounted in interior region 26. Optical components such as cameras 34 (not shown in FIG. 3) and/or optical modules 30 may be mounted to frame 40.

In the example of FIG. 3, internal frame 40 includes nose bridge structure 42. Nose bridge structure 42 overlaps nose bridge region NB and supports laterally extending elongated support members such as laterally extending support members 44. Members 44, which may sometimes be referred to as guide rods, support rails, elongated laterally extending support members, or support structures, may have circular cross-sectional shapes, oval cross-sectional shapes, rectangular cross-sectional shapes, I-shaped cross-sectional shapes, or other suitable cross-sectional shapes. Members 44 may be attached to structure 42 with adhesive, screws or other fasteners, welds, snaps or other engagement features, and/or other attachment mechanisms.

Members 44 may be divided into separate left and right segments that are joined, respectively, at nose bridge structure 42 or members 44 may have left and right portions that are joined by integral center portions such as illustrative center portion 44' (e.g., members 44 may have separate left and right portions or may be formed from single integral straight or bent rod that extends from the left to the right edge of device 10). Optical modules 30 may be fixed to members 44 at static locations (e.g., using screws or other fasteners, adhesive, welds, snaps or other engagement structures, etc.) or may have openings or other structures that receive members 44 while allowing optical modules 30 to slide along members 44. Configurations in which optical modules 30 are coupled to members 44 for sliding motion and can slide along members 44 may allow the lateral spacing between modules 30 to be adjusted (e.g., with an electrically adjusted actuator or other mechanism) to accommodate different user interpupillary distances. Internal frame 40 may support components in addition to optical modules 30 (e.g., cameras 34 and/or other components such as the components of input-output devices 24 of FIG. 2, communications circuitry 22 and/or control circuitry 20 of FIG. 2, etc.).

A user of device 10 may inadvertently drop device 10. This can result in a force on housing 12 such as illustrative force EF of FIG. 3. To help ensure that frame 40 and the components mounted to frame 40 are not plastically deformed, housing 12 may be coupled to frame 40 using compliant coupling structures such as illustrative elastic coupling member 46 of FIG. 3 and, if desired, additional elastic coupling members such as optional elastic coupling member 46T. Members such as member 46 may be formed from springs, silicone structures or other structures that can elastically deform under stress such as one or more layers formed from an elastomeric material (e.g., polymer, foam, and/or other materials that can help mechanically decouple frame 40 from housing 12 and that can help dampen vibrations, etc.). This decoupling can not only help prevent frame 40 from plastically deforming during high-stress conditions such as those experienced during a drop event, but can help prevent frame 40 from elastically deforming when stress is applied to housing 12. By preventing stress that is applied to housing 12 (e.g., stress that may arise as device 10 is being worn by a user) from reaching internal frame 40 and thereby elastically deforming frame 40, satisfactory alignment of optical modules and other optical components that are mounted to internal frame 40 can be assured.

Coupling members such as coupling member 46 may, if desired, be coupled between nose bridge structure 42 and nearby portions of housing 12 such as a central housing portion at the front of device 10 (e.g., using adhesive, screws or other fasteners, welds, snaps or other engagement structures, etc.). In the event of an impact on housing 12 from a drop event, coupling member 46 may help absorb energy from the impact and thereby help prevent damage (e.g., plastic deformation) to frame 40.

Another way that frame 40 can be protected from undesired damage (e.g., plastic deformation during a drop event) and that frame 40 can be protected from undesired elastic deformation that could misalign optical components involves the construction of housing 12. As shown in FIG. 3, housing 12 may be configured to deform elastically and/or plastically to a position such as deformed position 12' upon application of external force EF due to contact between device 10 and the ground or other surface in a drop event. Because housing 12 can deform, impact energy can be absorbed by housing 12, thereby reducing the amount of drop event force that is exerted on coupling member 46 and reducing the amount of drop event force that is exerted on frame 40 via coupling member 46. With this arrangement, housing 12, elastic housing-to-frame coupling structures such as coupling member 46, and internal frame 40 can be configured so that when housing 12 elastically and/or plastically deforms during a drop event, coupling member 46 elastically and/or plastically deforms during the drop event (preferably elastically), while frame 40 does not plastically deform during the drop event (although frame 40 may, if desired, deform elastically during the drop event). This prevents optical components that are being supported by internal frame 40 from becoming misaligned, even though housing 12 may be dented or otherwise deformed when excessive force is applied during the drop event.

Figure 4:
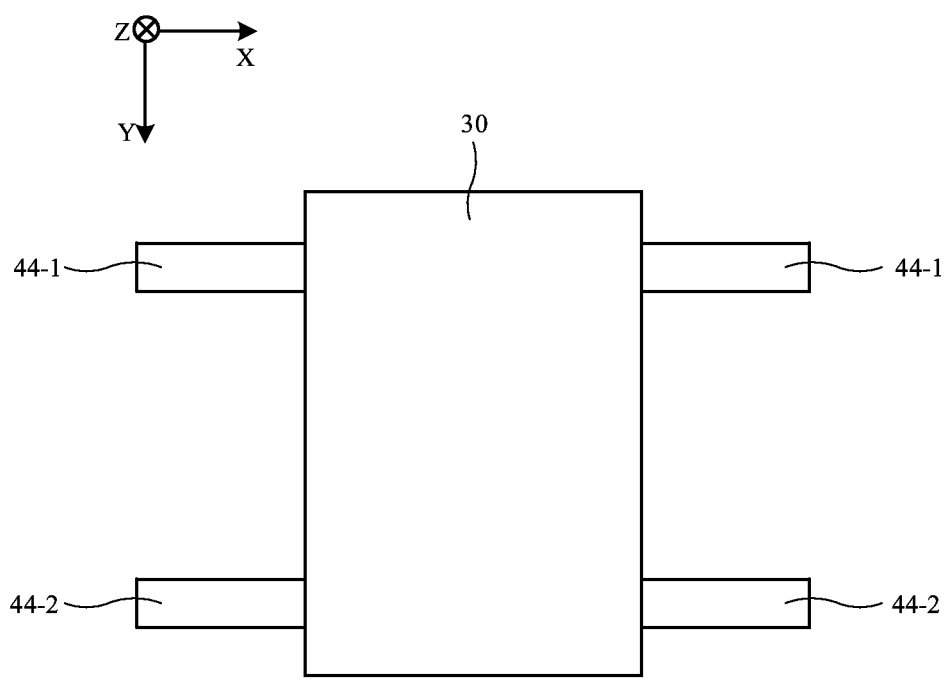
FIG. 4 is a rear view of illustrative optical component support structures mounted on guide rods in a frame in accordance with an embodiment.

Frame 40 may include any suitable number of laterally extending support members 44. As shown in the illustrative rear view of FIG. 4, for example, each optical module 30 may be supported by an upper member 44-1 and a lower member 44-2 that runs parallel to the upper member (e.g., there may be two of members 44 extending from the left side of nose bridge structure 42 and two of members 44 extending from the right side of nose bridge structure 42). Arrangements with three or more laterally extending support members on each side of device 10 may be used, if desired.

Figure 5:
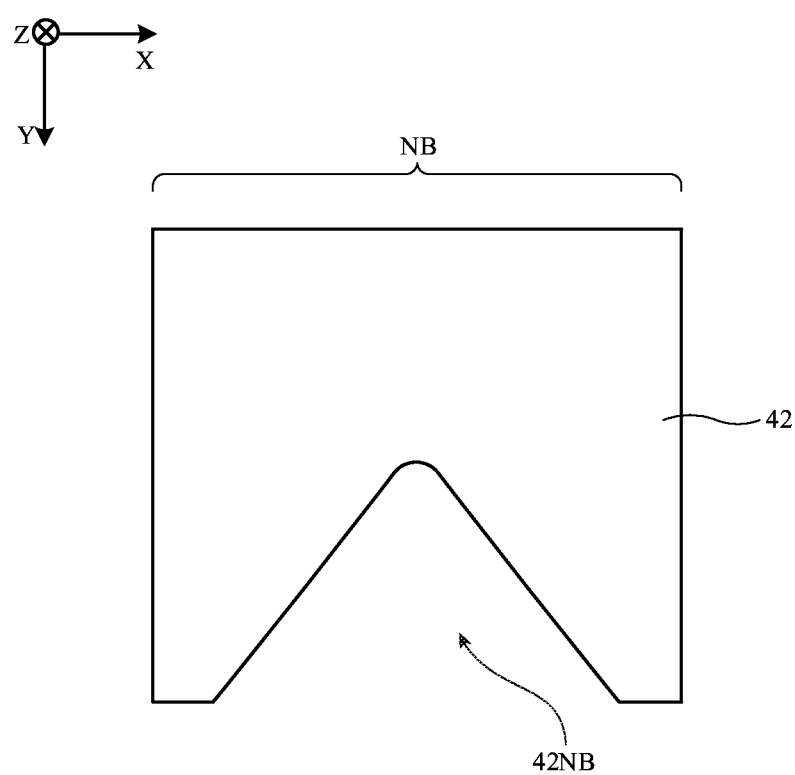
FIG. 5 is a rear view of an illustrative nose bridge structure in accordance with an embodiment.

FIG. 5 is a rear view of nose bridge structure 42. Structure 42 may be formed in a portion of device 10 that overlaps and is aligned with nose bridge region NB in the center of device 10. Portion 42NB of structure 42 (and, if desired, associated overlapping walls in housing 12 such as housing structures along the front, rear, and/or bottom surfaces of housing 12) may have a curved shape suitable for resting on a user's nose while device 10 is being worn on the head of the user.

The structures forming frame 40 such as structure 42 and members 44 may be formed from metal, carbon-fiber composite material and/or other fiber-composite materials, polymer, glass, ceramic, and/or other suitable materials. As an example, members 44 may be formed from stiff hollow fiber-composite rods coated with low-friction metal coatings, structure 42 may have a polymer body with optional fiber-composite stiffening plates configured to form a stiff hollow box structure, structures such as these may be formed from solid and/or hollow structures of metal or polymer (with or without embedded fibers to form fiber-composite material), and/or other structures may be used in forming frame 40. Adhesive, screws or other fasteners, welds, snaps or other engagement structures, and/or other structures may be used in forming frame 40. Frame 40 is preferably relatively rigid so that alignment of the optical components mounted to frame 40 can be ensured even as device 10 experiences changes in temperature and/or experiences vibrations.

Figure 6:
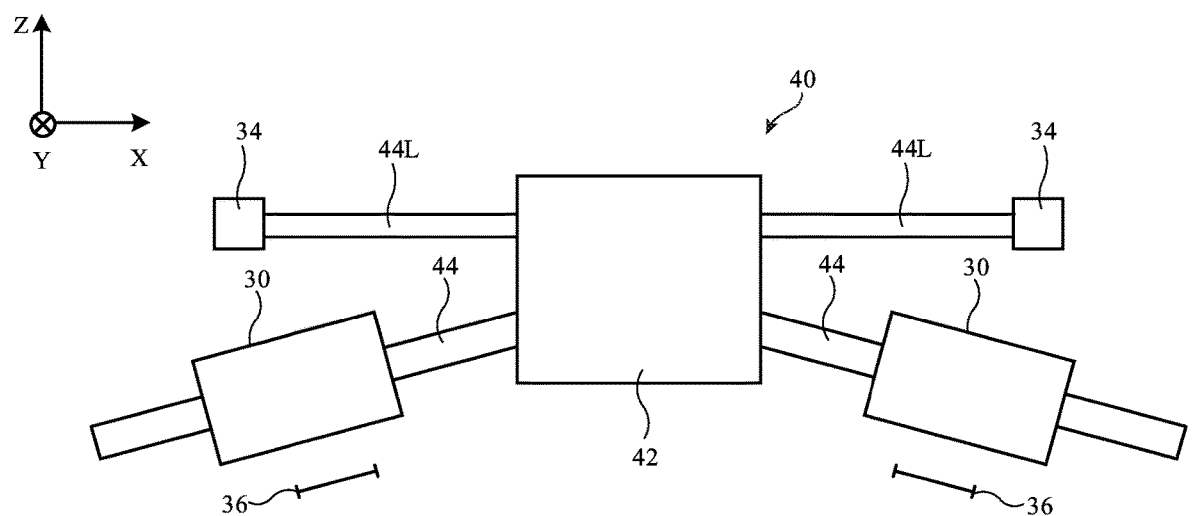
FIG. 6 is a top view of an illustrative internal frame supporting optical components such as cameras, displays, and lenses in accordance with an embodiment.

FIG. 6 is a top view of frame 40 in an illustrative configuration in which frame has additional laterally extending support members such as members 44L that are used to support cameras 34 in alignment with each other. Members 44L may be formed from separate left and right rods that are joined at support structure 42 and/or may be formed from portions of a single integrated laterally extending support structure. Members 44L may be coupled to structure 42 using adhesive, screws or other fasteners, welds, snaps or other engagement structures, etc.

The laterally extending support members of frame 40 (e.g., members 44L and/or members 44 of FIG. 6) may run straight across device 10 from left to right (e.g., these members may lie in the X-Y plane of FIG. 6) or may be bent where joined at structure 42. For example, to accommodate the slightly curved shape of the human face, it may be desirable to slightly rake back support members 44 as shown in FIG. 6. This type of bent laterally extending support member arrangement may help align modules 30 with the eyes of the user and may help device 10 conform to the shape of the user's face.

Figure 7:
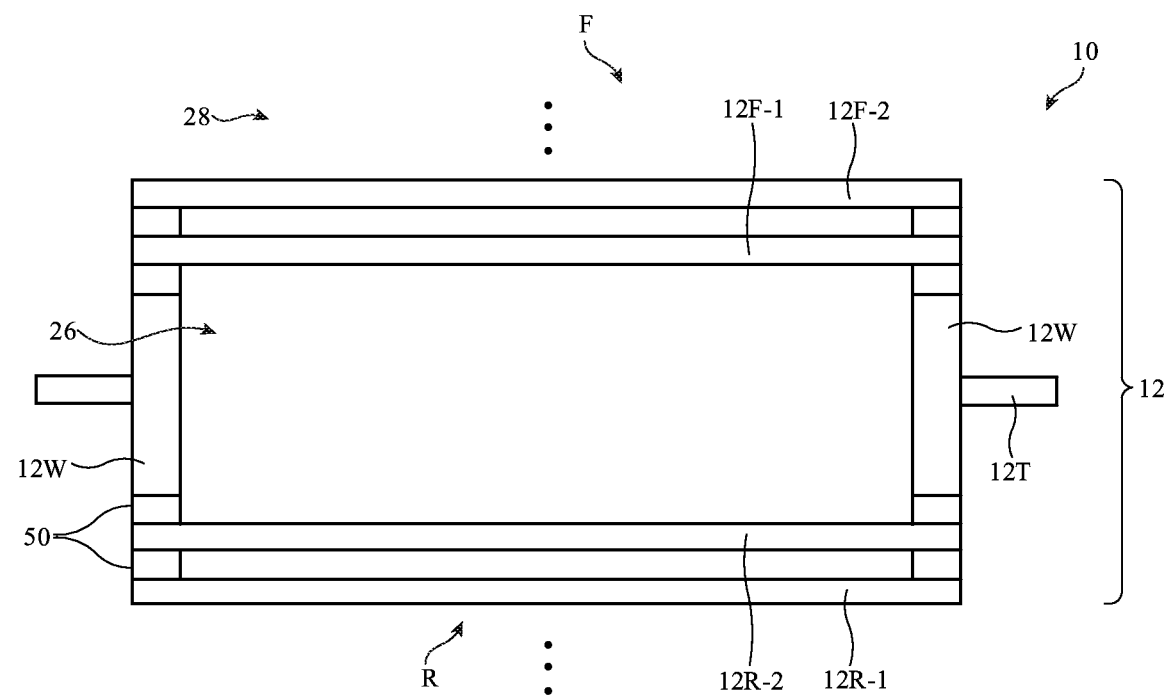
FIG. 7 is a top view of an illustrative housing for a head-mounted device in accordance with an embodiment.

Housing 12 may be formed from one or more structure that are attached to each other. Consider, as an example, illustrative housing 12 of FIG. 7. As shown in FIG. 7, housing 12 may include sidewall portions 12W that extend between one or more housing layers such as layers 12F-1 and 12F-2 on front face F and one or more housing layers such as layers 12R-1 and 12R-2 on rear face R. These housing structure may be attached to each other using attachment structures 50 (e.g., layers of adhesive, screws and other fasteners, welds, snaps and other engagement structures, etc.) and may enclose interior region 26 (e.g., an air-filled region in which frame 40 and the components attached to frame 40 are housed).

Layer 12F-1 on front face F of housing 12 may be, as an example, a transparent display cover layer that overlaps a display and that serves as an outermost housing layer for the front face of device 10 and layer 12F-2 may include a pixel array for a front-facing display that displays images visible through layer 12F-1. If desired, housing 12 may include one or more additional layers between interior region 26 and layer 12F-1 (e.g., one or more printed circuit board layers, one or more structures with heatsinks and fans, etc.). Layer 12R-2 may be a rigid polymer member that has left and right openings aligned, respectively, with left and right eye boxes and left and right optical modules. Layer 12-R1 may be the rearmost layer of housing 12 and may include a fabric covering or other rear cosmetic cover layer that is attached to layer 12R-2. Openings in layer 12-R1 may be aligned with the left and right openings in layer 12R-2 (as an example). Additional layers may be provided in housing 12 between layer 12R-2 and interior 26, if desired (e.g., a printed circuit board layer, etc.).

If desired, device 10 may include structures that help limit the displacement of the structures in interior region 26 relative to housing 12. For example, hard stop structure (sometimes referred to as hard stops or displacement-limiting structures) may be formed in housing 12 that help prevent portions of frame 40 from bending or otherwise deforming more than a predetermined amount. These hard stops may, as an example, prevent the internal structures from deforming sufficiently to incur plastic deformation. Smaller amounts of elastic deformation may be permitted.

Figure 8:
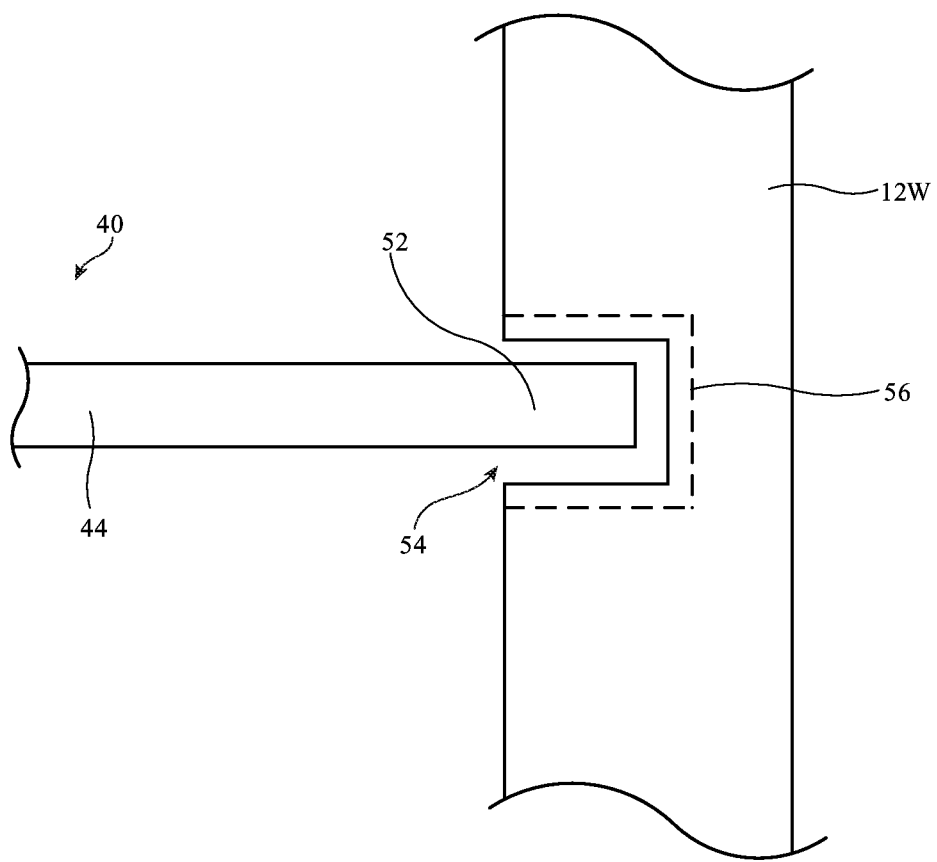
FIG. 8 is a cross-sectional view of an illustrative housing structure with a recess forming a hard stop that receives an end portion of an elongated laterally extending support member in an internal frame in accordance with an embodiment.

Consider, as an example, the hard stop arrangement of FIG. 8. In the example of FIG. 8, a portion of housing 12 such as sidewall portion 12W has recess 54. The surfaces of recess 54, which are used to form a hard stop structure, are separated from the surfaces of end 52 of support member 44 by a gap. This gap may be filled with air or a viscous fluid (e.g., oil). If desired, the interior of recess 56 may be provided with an elastomeric coating layer such as layer 56 (e.g., a rubber gasket, etc.) to provide cushioning during a drop event.

During normal operation, vibrations and other relatively gentle impacts on device 10 will cause frame 40 to move relative to housing 12 by less than the distance of the gap between end 52 and the hard stop. Nose bridge support structure 42 is coupled to the middle of housing 12 (e.g., using elastic coupling ember 46), but the rest of frame 40 (e.g., members 44) do not, in this example, contact any portion of housing 12 and are suspended in air. As a result, the portion of housing 12 forming the hard stop will not exert any direct force on end 52 and will therefore not deform frame 40 and will not cause any misalignment between the optical module, cameras, and/or other optical components that are coupled to the frame. There will be some mechanical coupling between housing 12 and frame 40 through coupling member 46 (FIG. 3), but this mechanical coupling will be attenuated by the damping material of member 46.

In the event that device 10 is subjected to a large impact (e.g., an undesired drop event in which device 10 is dropped from a large height onto a hard surface), end 52 of member 44 in frame 40 will bottom out on the surface of the hard stop. The size of the gap between frame 40 and the hard stop may be configured to be less than the amount of frame deformation that is expected to result in plastic deformation of frame 40. As a result, frame 40 will be prevented from plastically deforming during the drop event, thereby ensuring that the components on frame 40 will remain satisfactorily aligned with each other and with eye boxes 36, even when device 10 experiences undesirably large amounts of stress. Hard stops may be formed from any suitable portions of housing 12 (e.g. the front and rear housing layers of FIG. 7, housing sidewalls, structures attached to these layers, etc.). Hard stops formed from portions of housing 12 may be used to prevent over-travel of members 44 and/or any other portions of frame 40. The example of FIG. 8 in which hard stops are used to prevent excess bending of member 44 of frame 40 is illustrative.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is illustrative and various modifications can be made to the described embodiments. The foregoing embodiments may be implemented individually or in any combination.

What is claimed is:

1. A head-mounted device, comprising:
   a frame;
   first and second optical components supported on the frame; and
   a housing with an interior region that encloses the frame and the first and second optical components, wherein the housing separates the interior region from an exterior region surrounding the housing, and wherein the frame has a nose bridge structure in the exterior region and has laterally extending support members in the interior region that extend from the nose bridge structure without contacting the housing.

2. The head-mounted device defined in claim 1 wherein the laterally extending support members comprise laterally extending support members on left and right sides of the frame and wherein the housing has portions forming left and right hard stop structures configured to receive, respectively, left and right ends of the laterally extending support members.

3. The head-mounted device defined in claim 2 wherein the first and second optical components comprise, respectively, left and right displays.

4. The head-mounted device defined in claim 3 further comprising a left optical module containing the left display and a left lens through which a left image on the left display is visible from a left eye box and a right optical module containing the right display and a right lens through which a right image on the right display is visible from a right eye box.

5. The head-mounted device defined in claim 4 wherein the laterally extending support members are configured to slidably couple to the left and right optical modules.

6. The head-mounted device defined in claim 4 further comprising an elastic coupling member that couples the frame to the housing.

7. The head-mounted device defined in claim 6 wherein the housing is configured to form an enclosure having a front portion, a rear portion, and sidewall portions extending between the front portion and the rear portion and wherein the housing is only coupled to the frame through the elastic coupling member.

8. The head-mounted device defined in claim 7 further comprising first and second cameras attached to the frame.

9. The head-mounted device defined in claim 1 wherein the first and second optical components comprise, respectively, left and right displays configured to provide left and right images to left and right eye boxes.

10. The head-mounted device defined in claim 1 wherein the nose bridge structure comprises a nose-shaped recess.

11. The head-mounted device defined in claim 10 wherein the laterally extending support members comprise a left guide rod configured to support the first optical component in alignment with a left eye box and a right guide rod configured to support the second optical component in alignment with a right eye box.

12. The head-mounted device defined in claim 1 wherein the laterally extending support members and the housing are configured so that, in response to a drop event, the housing deforms plastically without causing the frame to deform plastically.

13. A head-mounted device, comprising:
   an internal frame having left and right guide rods coupled to a nose bridge structure;
   left and right optical modules mounted for sliding motion to the left and right guide rods, respectively; and
   a housing that separates an interior region in which the left and right optical modules and the internal frame are located from an exterior region surrounding the housing, wherein the internal frame is surrounded by the housing, and the housing is only coupled to the internal frame at the nose bridge structure.

14. The head-mounted device defined in claim 13 further comprising a coupling member configured to couple the nose bridge structure of the internal frame to the housing.

15. The head-mounted device defined in claim 14 further comprising left and right cameras mounted to the internal frame.

16. The head-mounted device defined in claim 15 wherein the internal frame and the housing are configured so that, when the housing deforms plastically during a drop event, the internal frame does not deform plastically.

17. The head-mounted device defined in claim 14 wherein the coupling member comprises an elastomeric material.

18. A head-mounted device, comprising:
   a housing having a front housing layer on a front face of the housing and having a rear housing layer on an opposing rear face of the housing, wherein the housing surrounds and encloses an interior region;
   an internal frame in the interior region, wherein the internal frame has a nose bridge structure and has first and second elongated support members extending, respectively, from opposing left and right sides of the nose bridge structure without contacting the housing, and wherein the first and second elongated support members are in the interior region;
   a first optical component supported by the first elongated support member; and
   a second optical component supported by the second elongated support member.

19. The head-mounted device defined in claim 18 wherein the first optical component comprises a first optical module having a first display and a first lens configured to provide a first image to a first eye box and wherein the second optical component comprises a second optical module having a second display and a second lens configured to provide a second image to a second eye box.

20. The head-mounted device defined in claim 19 wherein the first and second optical modules are configured to slide along the first and second elongated support members, respectively.

* * * * *